United States Patent

[11] 3,600,616

[72] Inventor Masahiro Yokoyama
 Nagoya, Japan
[21] Appl. No. 845,856
[22] Filed July 29, 1969
[45] Patented Aug. 17, 1971
[73] Assignee Mitsubishi Denki Kabushiki Kaisha
 Tokyo, Japan
[32] Priority Aug. 1, 1968
[33] Japan
[31] 43/54,568

[54] CLUTCH MOTOR WITH ELECTROMAGNETICALLY OPERATED AUXILIARY BRAKING MEANS
 5 Claims, 3 Drawing Figs.

[52] U.S. Cl. ................................................ 310/76,
 192/18 B
[51] Int. Cl. ........................................... H02k 7/112
[50] Field of Search .......................................... 310/76, 77,
 78, 74, 100; 192/2, 8, 14, 12, 16, 9, 146, 18 B;
 57/12 D, 80

[56] References Cited
UNITED STATES PATENTS

| | | | |
|---|---|---|---|
| 3,446,322 | 5/1969 | Wrensch | 192/18 B |
| 3,387,157 | 6/1968 | Cook et al. | 310/258 |
| 2,800,209 | 7/1957 | Winz | 192/14 |
| 2,465,601 | 3/1949 | Ochtman | 192/2 |
| 3,464,527 | 9/1969 | Baker | 192/72 |
| 3,277,357 | 10/1966 | Willis | 318/304 |
| 3,493,796 | 2/1970 | Siegel | 310/76 |

Primary Examiner—Milton O. Hirshfield
Assistant Examiner—B. A. Reynolds
Attorneys—Robert E. Burns and Emmanuel J. Lobato ABSTRACT: Upon stopping an output shaft driven by an electric motor, a clutch is driven into the partly clutched mode of operation through energization of electromagnets. An auxiliary brake disposed on the shaft is also operated by the electromagnets to maintain that mode of operation stable. The electromagnets respond to the associated load being at its predetermined position to be deenergized to stop the shaft and therefore the load at that position.

PATENTED AUG 17 1971 3,600,616

3,600,616

CLUTCH MOTOR WITH ELECTROMAGNETICALLY OPERATED AUXILIARY BRAKING MEANS

BACKGROUND OF THE INVENTION

This invention relates to a clutch motor, and more particularly to improvements in a clutch motor suitable for use with a sewing machine or the like.

When driven rotary machines, for example sewing machines, are put in rotation by the respective electric motors it has been commonly practiced to control the clutch and brake disposed between the machine and motor to selectively stop the machine at its predetermined positions while the motor is always put in operation. For sewing machines such predetermined positions may be, for example, the upper and lower ends of a stroke for the associated sewing needle. In the normal operation, a sewing machine is operatively coupled to its clutch to be driven with a predetermined number of rotation of from 1000 to 5000 r.p.m. by the associated motor. Upon stopping the sewing machine, the clutch is caused to disengage from the motor and instead the associated brake applies a braking action to the clutch. Under these circumstances, if the sewing machine rotating with the number of rotation ranging from 1000 to 5000 r.p.m. is suddenly stopped it will undergo a considerable mechanical shock while it is very difficult to stop the machine at the particular predetermined position. To avoid those drawbacks, there has been lately proposed a control system for electrically putting the machine in a partly clutched mode of operation at a low speed, for example, such as a speed corresponding to 150 to 200 r.p.m. and then stopping the machine at a selected one of its predetermined positions when a fixed point stop mechanism involved senses that position. At such a low speed the sewing machine is allowed to be accurately stopped at the selected one of its predetermined positions as rapidly as within 0.3 to 0.4 seconds. The partly clutched mode of operation might be performed at a speed considerably higher than the figure as above specified so that it was difficult to stop the machine at the particular predetermined position.

SUMMARY OF THE INVENTION

Accordingly it is an object of the invention to provide a new and improved clutch motor for performing the partly clutched mode of operation in stable manner for the purpose of stopping the associated load at its predetermined position.

The invention accomplishes this object of the invention by the provision of a clutch motor comprising an electric motor, an output shaft from transmitting a power from the electric motor to a load, a clutch wheel disposed in fixed relationship on the output shaft to transmit the power from the electric motor to the output shaft, in the normal mode of operation, and a stop plate capable of stopping the rotational movement of the output shaft, characterized by means capable of engaging the clutch wheel to drive the latter into the partly clutched mode of operation after the clutch wheel has changed from the normal mode of operation and at least before the output shaft is stopped to be rotated, and auxiliary brake means for applying the braking action to the clutch wheel when the latter is in the partly clutched mode of operation.

In a preferred embodiment of the invention, the means for driving the clutch wheel into the partly clutched mode of operation may include electromagnet means responsive to a predetermined number of rotation in unit time of the output shaft before the latter is stopped to be rotated to be energized to permit the clutch wheel to be drive by the electric motor and the auxiliary brake means may be fixedly mounted on the output shaft to be operative in response to the energization of the electromagnet means.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
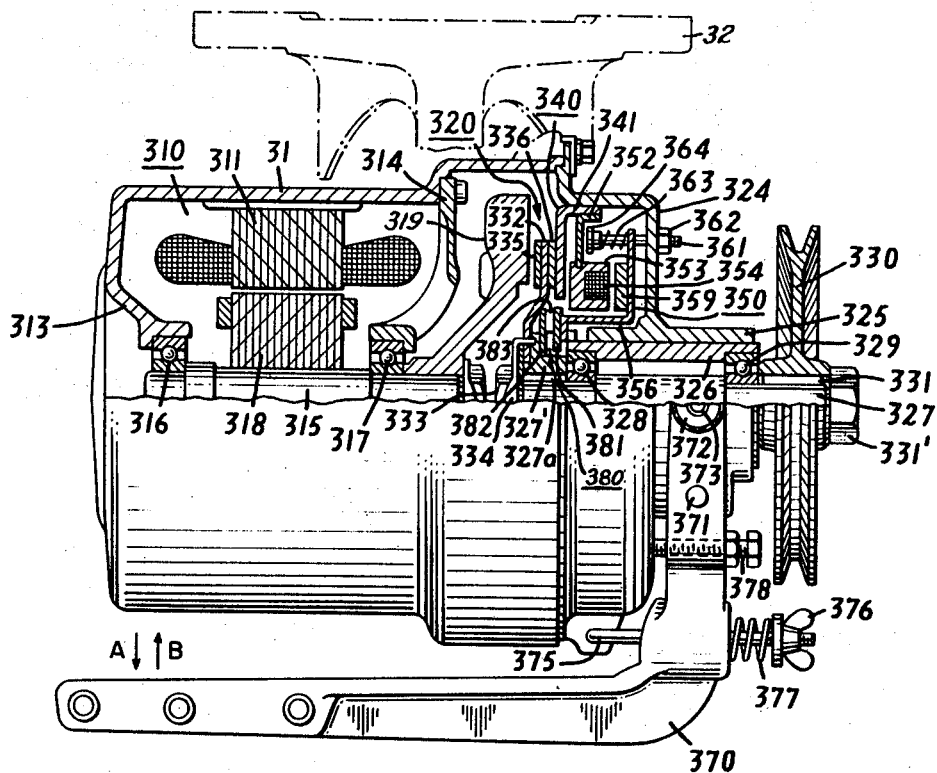
FIG. 1 is an elevational view, partly in longitudinal section of a clutch motor constructed in accordance with the principles of the invention.

Referring now to the drawing and FIG. 1 in particular, it is seen that an arrangement disclosed herein comprises an electric motor generally designated by the reference numeral 310 and serving to rotate the associated sewing machine (not shown). The motor 310 comprises a housing 31 supported to the sewing machine through a mounting frame 32 and a stator member 311 rigidly secured to the inner peripheral surface of the housing 31 including an end bracket 313 and an intermediate bracket 314. The motor 310 further comprises a rotary shaft 315 rotatably supported at both ends to the brackets 313 and 314 through a pair of ball bearings 316 and 317, and a rotor member 318 rigidly secured on the rotary shaft 315 to form a small annular gap between the same and the opposite stator member 311. The rotary shaft 315 is provided at that end projecting beyond the intermediate bracket 314 with a flywheel 319 which constitutes a rotationally driven input member.

As shown in FIG. 1, the electric motor 310 is axially aligned with a clutch device generally designated by the reference numeral 320 and disposed within a bracket 324 connected to the housing 31. The bracket 324 has integrally extending through the central portion thereof a sleeve type bearing 325 whose longitudinal axis is aligned with that of the motor shaft 315. Fitted into the axial bore in the bearing 325 is a movable hollow cylindrical bearing member 326 mounted for limited axial movements. Then the movable bearing member 326 has an output shaft or output member 327 rotatably supported on the inner peripheral wall surface through a pair of ball bearings 328 and 329. Therefore it will be appreciated that the output shaft 327 has the longitudinal axis aligned with that of the motor shaft 315. The end portion of the output shaft 327 remote from the motor 310 and projecting beyond the movable bearing member 326 has a driving pulley 330 keyed 331 thereon for limited axial movement along the output shaft. A locking nut 331' is screw threaded into that end of the output shaft 327 to prevent the driving pulley 330 from disengaging from the output shaft. The pulley 330 serves to transmit a power from the output shaft 327 to the associated, in this case, the sewing machine (not shown) in the well known manner.

The output shaft 327 is provided on the other end or the left-hand end as viewed in FIG. 1 with a clutch wheel 332 rigidly secured on a hub portion 327' by a locking nut 333 and a detend washer 334. The hub portion 327' is keyed at 327a and fixed on the output shaft 327 by the nut 333. The clutch wheel 333 is provided on both sides of its outer peripheral edge portion with a pair of annular friction plates or facings 335 and 336 one of which 335 opposes to the flywheel 319 to normally form a small gap therebetween.

The clutch wheel 332 is operatively associated with a main brake device generally designated by the reference numeral 340. The main brake device 340 includes an annular stationary stop plate 341 fixed to the inner peripheral wall surface of the said right-hand bracket 324 to oppose to the friction plate 336 serving as a stationary element in the brake device 340 adapted to engage the annular friction plate 336 on the clutch wheel 332.

Electromagnetic means comprising an electromagnet device generally designated by the reference numeral 350 is disposed to control the axial movement of the clutch devices 320. The electromagnet device 350 comprises a supporting annulus 352 rigidly secured to the annular stationary stop plate 341, a stationary iron core 353 in the form of an annulus of U-shaped cross section, and an exciting winding 354 inductively disposed around the stationary core 353. The electromagnet device 350 further comprises a movable flanged annulus 356 fixed to that end portion near to the clutch wheel 332 of the movable bearing member 326, for axial movement with the bearing member 326 but against the rotational movement, and a movable iron piece 359 in the form of a disc fixed on that surface adjacent the stationary core 353 of the flange of the annulus 356 to oppose to the latter with a small air gap normally formed therebetween.

A threaded rod 361 extends through both the outer peripheral edge portion of the flange of the annulus 356 and the right-hand bracket 324 and fixed at one end to the latter by nuts 362. A helical spring 363 is disposed around the rod 361 between the flange of the movable annulus 356 and a flange disposed at the inner or other end of the rod. The spring 363 serves to impart to the movable annulus 356 a force tending to move the supporting annulus 356 away from the stationary core 353.

A pair of the electromagnet devices 350 just described are preferably disposed in diametrically opposite relationship around the sleeve type bearing 325 although only one of the electromagnet device is illustrated in FIG. 1.

In order to move the movable bearing member 326 and the output shaft 327 toward and away from the flywheel 319, an operating L-shaped lever 370 is pivotably mounted on one arm thereof to the right-hand bracket 324 by a pivot pin 371 and the one arm has its end portion 372 formed into a yoke serving to put the sleeve type bearing 325 therebetween. The yoke portion is then provided on the opposite ends with a pair of opposite bolts or pins 373 extending therethrough. Each bolt 373 extends through an axially elongated slot (not shown) disposed on the sleeve type bearing 325 until it is loosely fitted into an elongated recess (not shown) disposed on the movable bearing member 326. A partly threaded rod 375 extends through the one arm of the lever 370 at its position below the position of the pivot pin 371 and is supported at one end to the right-hand bracket 324. The threaded rod 375 has a butterfly nut 376 screw threaded onto the other end portion and a helical spring 377 disposed around the same between the nut 376 and the one arm of the lever 370. The helical spring 377 tends to rotate the lever 370 in the clockwise direction as viewed in FIG. 1. In order to limit the rotational movement of the lever 370 in the clockwise direction as viewed in FIG. 1, an adjusting screw 378 adjustably extends through the one arm of the lever 370 intermediate the pivot pin 371 and the rod 375.

As shown in FIG. 1, an auxiliary brake device generally designated by the reference numeral 380 is disposed on that side of the clutch wheel 332 remote from the flywheel 319. The auxiliary brake device 380 comprises an auxiliary annular stationary stop plate 381 rigidly secured to the flanged annulus 356 on that portion fixed to the movable bearing member 326, an auxiliary brake wheel 382 fixedly mounted on the hub portion 327' on the output shaft 327 and an annular friction plate 383 disposed on that surface near to the stationary stop plate 381 of the auxiliary brake wheel 382. The friction plate 383 normally engages the auxiliary stop plate 381.

It is now assumed that the operating lever 370 is in its position as illustrated in FIG. 1 where the adjusting screw 378 is contacted at its free end by the bracket 324 by the action of the spring 377 tending to rotate the end of the other lever arm in the direction of the arrow B shown in FIG. 1 and about the axis of the pivot pin 371 while the electromagnet device 350 is in its deenergized state. Under the assumed condition, the spring 363 applies a thrust to the clutch wheel 332 through the flanged annulus 356, the movable bearing member 326 and the output shaft 327 tending to move the clutch wheel 332 in the right-hand direction as viewed in FIG. 1 thereby to maintain it in engagement with the stationary stop plate 341. Under these circumstances the electric motor 310 is allowed to start under its nonloading state.

After the motor 310 has been started, the operating lever 370 is moved in the direction of the arrow A shown in FIG. 1 and about the axis of the pivot pin 371 to apply a thrust to the clutch wheel 332 through the yoke pins 373 on the lever, the movable bearing member 326, the ball bearing 328 and the hub portion 327' on the output shaft 327 to move the clutch wheel 322 in the left-hand direction or toward the flywheel 319 until both the wheels are put in engagement with each other thereby defining the fully clutched mode of operation. This permits the rotational movement of the electric motor 310 to be transmitted to the output shaft 327 whereby the associated sewing machine (not shown) is put in operation. The mode of operation just described is quite the same as that effected by the conventional type of clutch motors.

If it is desired to stop the sewing machine, the operating lever 370 can be released to permit it to be moved in the direction of the arrow B and about the axis of the pivot pin 371 until it is returned back to its original position. At that time the spring 363 permits the clutch wheel 332 to disengage from the flywheel 319 and push against the stationary stop plate 341. Therefore the output shaft and therefore the sewing machine will rapidly decelerate along curve "S" shown in FIG. 2.

Figure 2A:
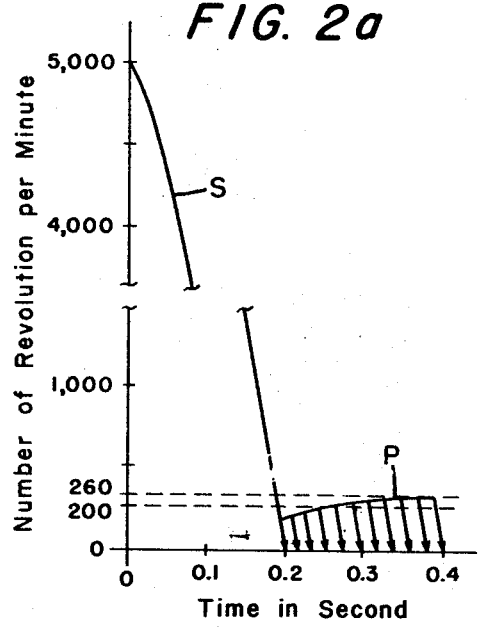
FIGS. 2a and b are graphical representations of the number-of-rotation to time characteristics exhibited upon stopping clutch motor illustrated in FIG. 1 and the conventional type of clutch motors respectively.
Figure 2B:
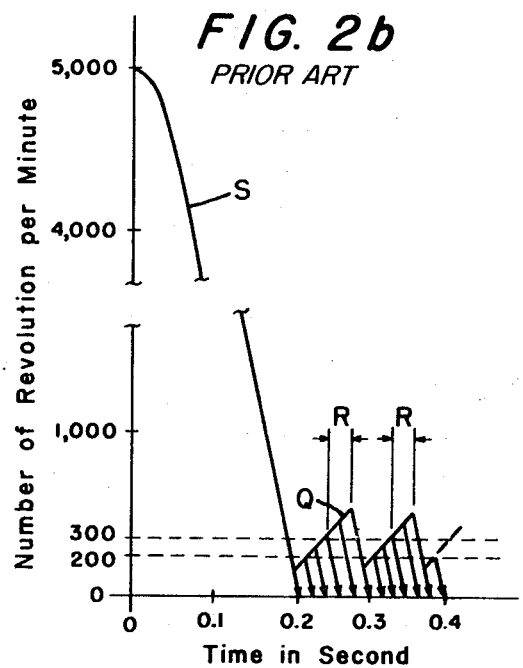

FIG. 2a shows the deceleration characteristic exhibited upon stopping the clutch motor of the invention and FIG. 2b shows the same characteristic exhibited upon stopping the conventional type of clutch motors. In both FIGS., the ordinate represents the number of rotations per minute or the output shaft 327 or the associated sewing machine and the abscissa represents time in seconds. Curve "S" shown in FIG. 2 depicts that the output shaft 327 or the sewing machine operated with about 5000 r.p.m. has rapidly decelerated when the output shaft 327 reaches a predetermined number of rotation in unit time for example about 200 r.p.m. during its deceleration process a speed sensor (not shown) disposed on the rotary shaft of the associated sewing machine is arranged to be operated to excite the exciting winding 354 of each electromagnet device 350. This causes the movable iron core 359 to be moved toward the stationary core 353 by the attraction exerted therebetween and place the device in its partly clutched mode of operation. Then the auxiliary stop plate 381 on the flanged annulus 356 pushes against the auxiliary brake wheel 382 through the annular friction plate 383 to move the clutch wheel 332 toward the flywheel 319 until both wheels engage each other. Therefore the clutch wheel 332 is driven by the flywheel 319 with slippage therebetween to increase in the number of rotation of the output shaft 327 or the machine. The stop plate 381 does not rotate and therefore applies a continuous braking action to the rotating clutch wheel 332 and such causes the friction surface 335 of the clutch wheel to rotate with slippage against the surface of the flywheel 319. This braking action of the auxiliary brake device 380 effectively reduces and stabilizes the rotational speed of the output shaft 327 during the partly clutched mode of operation; However the above-mentioned speed sensor and a voltage control circuit (not shown) operatively coupled thereto are adapted to control the electromagnet devices 350 such that the number of rotation in unit time of the output shaft 327 is maintained approximately at a predetermined magnitude, for example 200 r.p.m. Therefore, after the clutch wheel 332 has again engaged the flywheel 319 the number of rotation in unit time of the output shaft 327 will not exceed such a magnitude.

However, the conventional type of clutch motors having no auxiliary brake wheel 382 have been put in the ON-OFF mode of operation due to time delays in response inherent to the above-mentioned speed sensor and control circuit as well as a time delay in mechanical and electrical response inherent to the electromagnet device. While the reengagement of the clutch wheel with the flywheel has averaged about 200 r.p.m. of the output shaft 327 and therefore the associated machine could rapidly increase in the number of rotation in unit time as shown at curve Q in FIG. 2b. In other words, at the instant the control circuit has been operated to deenergize the electromagnet devices 350 the machine could reach a considerably high number of rotation in unit time with the result that it has been difficult to impart to the machine a low speed stabilized in the partly clutched state stabilized and smoothed. For the purpose of stopping a driven element such as a sewing needle (not shown) at its predetermined position, a position sensor is known to be disposed on a shaft for driving such a sewing needle although it is not illustrated in FIG. 1. When the position sensor senses the sewing needle being at its predetermined position it provides a command for deenergizing the associated voltage control circuit and therefore the electromagnet devices 350. In an extreme case the sewing needle effects the inching movement such as above described, the sewing machine may have the instantaneous number of rotation in unit time for greater than 200 r.p.m. at the instant the above-mentioned command has deenergized the control circuit and therefore the electromagnet devices. Under these circumstances, the sewing machine or the needle will repeatedly overshoot its predetermined position as shown at curve Q in FIG. 2b. If and only if the sewing machine would unexpectedly have the instantaneous number of rotation in unit time equal to or less than 200 r.p.m. at the instant the said command has been delivered from the position sensor, then the machine may be stopped at its predetermined position. In fact, it has been difficult to be expected that the conventional clutch motor would rapidly stop the associated sewing needle at its predetermined position. This is shown at a curve portion labeled the reference character "R" in FIG. 2b. That is, if the sewing machine is rotating with the number of rotation in unit time on the curve portion "R" on which the number of rotation in unit time exceeds for example 300 r.p.m. then the deenergization of the electromagnet devices 350 does not lead to stopping of the machine at its predetermined position.

However, the provision of the auxiliary brake device 380 according to the invention permits the clutch wheel 332 to be braked through that auxiliary brake device 380 whenever the electromagnet devices 350 are energized with the result that a proper braking action is applied to the clutch wheel thereby to permit the machine to slowly increase in speed along the curve P shown in FIG. 2a. During this slow increase in speed of the machine, the control circuit as above described and the electromagnet devices can satisfactorily respond to the particular command from the position sensor as above described to permit the partly clutched mode of operation to be stably continued. Therefore it will readily be apparent that whenever the electromagnet devices can respond to a command from the position sensor to stop the machine at its predetermined position.

In summary, the invention provides a clutch motor comprising, in addition to the main brake device, the auxiliary brake device capable of properly braking the clutch wheel in the partly clutched mode of operation. This permits the output shaft to be driven at a low speed stabilized in the partly clutched mode of operation because its number of rotation in unit time can only change by a very small magnitude. Therefore the invention is very great in practical value particularly for the purpose of stopping sewing needles or the like at the predetermined position.

While the invention has been described in terms of a sewing machine, it is to be understood that it is equally applicable to driven rotary machines other than sewing machines.

What I claim is:

1. In a clutch motor comprising an electric motor, an output shaft connected to said electric motor for transmitting power from said electric motor to a load, a movable clutch wheel disposed in fixed relationship with said output shaft to transmit power from said electric motor to said output shaft during the normal mode of operation of the clutch motor and a stop plate capable of engaging said clutch wheel to stop the rotational movement of said output shaft, the combination of means for placing said clutch wheel in a partly clutched mode of operation before said output shaft completely stops rotating, and auxiliary brake means for applying a braking action to said clutch wheel when the latter is in the partly clutched mode of operation.

2. A clutch motor as claimed in claim 1 wherein said means for placing said clutch wheel in the partly clutched mode of operation includes electromagnet means, and wherein said auxiliary brake means are fixedly mounted on said output shaft to be operative in response to the energization of said electromagnetic means.

3. In combination: a rotationally driven input member rotatable about a longitudinal axis; a stationary braking surface spaced apart from said input member along said longitudinal axis; a clutch wheel having friction facings on each side thereof movably disposed between said input member and said braking surface; an output member connected to said clutch wheel for movement therewith; mounting means mounting said clutch wheel and output member for both rotary movement together about said longitudinal axis and translational movement together along said longitudinal axis between a first working position wherein said clutch wheel frictionally engages with said input member to effect rotation of said output member at a given speed and a second working position wherein said clutch wheel frictionally engages with said braking surface; moving means for effecting movement of said clutch wheel to said first and second working positions; and means operable when said moving means has moved said clutch wheel to said second working position for effecting movement of said clutch wheel to said first working position while concurrently applying a braking action to said clutch wheel to effect rotation of said output member at a speed less than said given speed.

4. A combination according to claim 3; wherein said last-mentioned means comprises electromagnetic means for electromagnetically effecting movement of said clutch wheel to said first working position, and braking means rendered effective during movement of said clutch wheel to said first working position by said electromagnetic means to apply said braking action to said clutch wheel.

5 A combination according to claim 3; wherein said last-mentioned means comprises at least one rotationally stationary magnetic member having a braking surface portion, means mounting said magnetic member for translational movement relative to said clutch wheel and output member, a friction lining connected to said clutch wheel in oppositely spaced-apart relationship from said braking surface portion of said magnetic member, and means spaced-apart from said magnetic member for selectively creating a magnetic flux coacting with said magnetic member to effect translational movement of said braking surface portion of said magnetic member into frictional engagement with said friction lining followed by translational movement of said clutch wheel into said first working position.